Aug. 11, 1953     R. E. BYLER ET AL     2,648,601
PROCESS FOR THE RECOVERY OF PRECIOUS METAL VALUES
Filed July 16, 1948     2 Sheets-Sheet 1
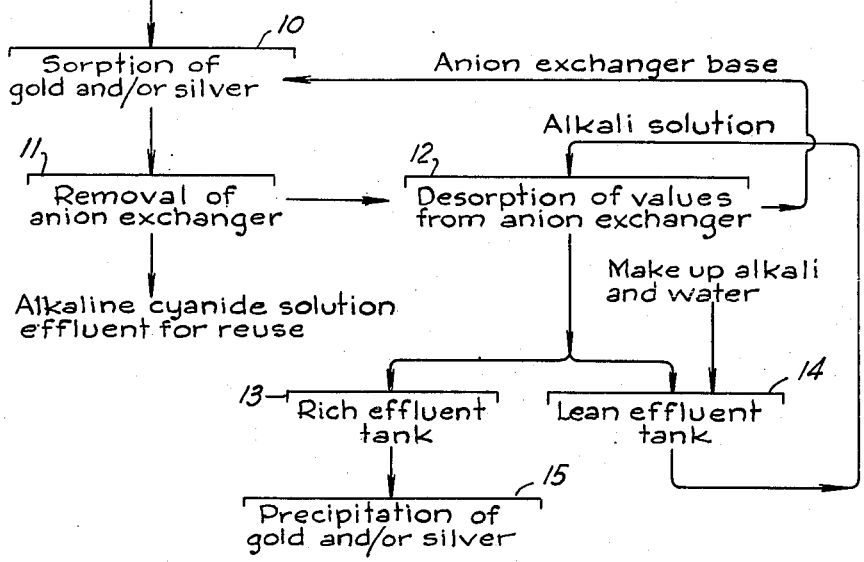
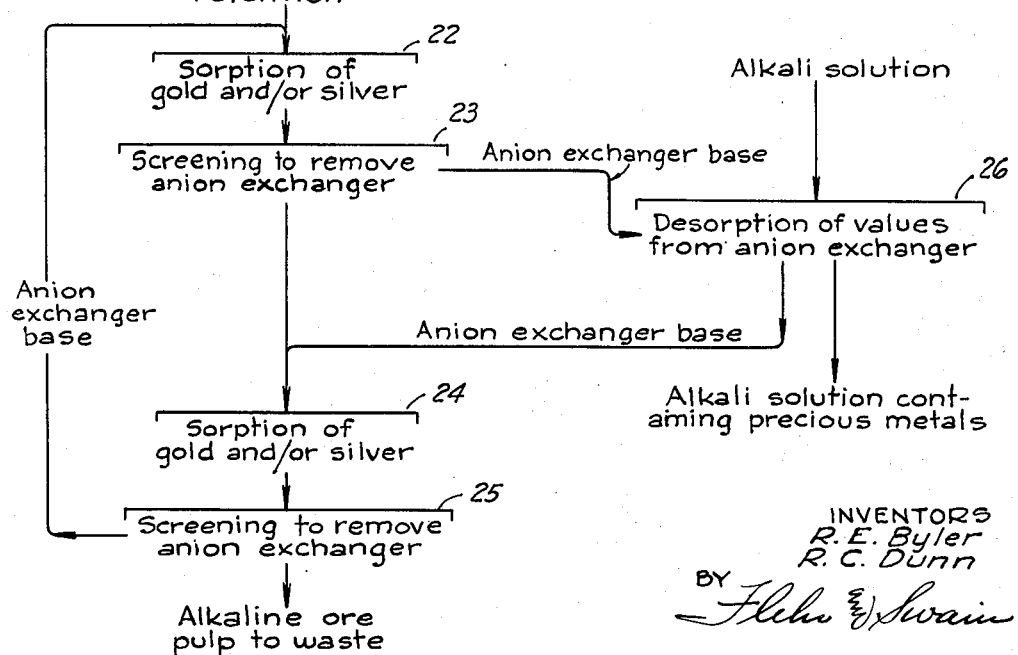
INVENTORS
R. E. Byler
R. C. Dunn
BY
ATTORNEYS.

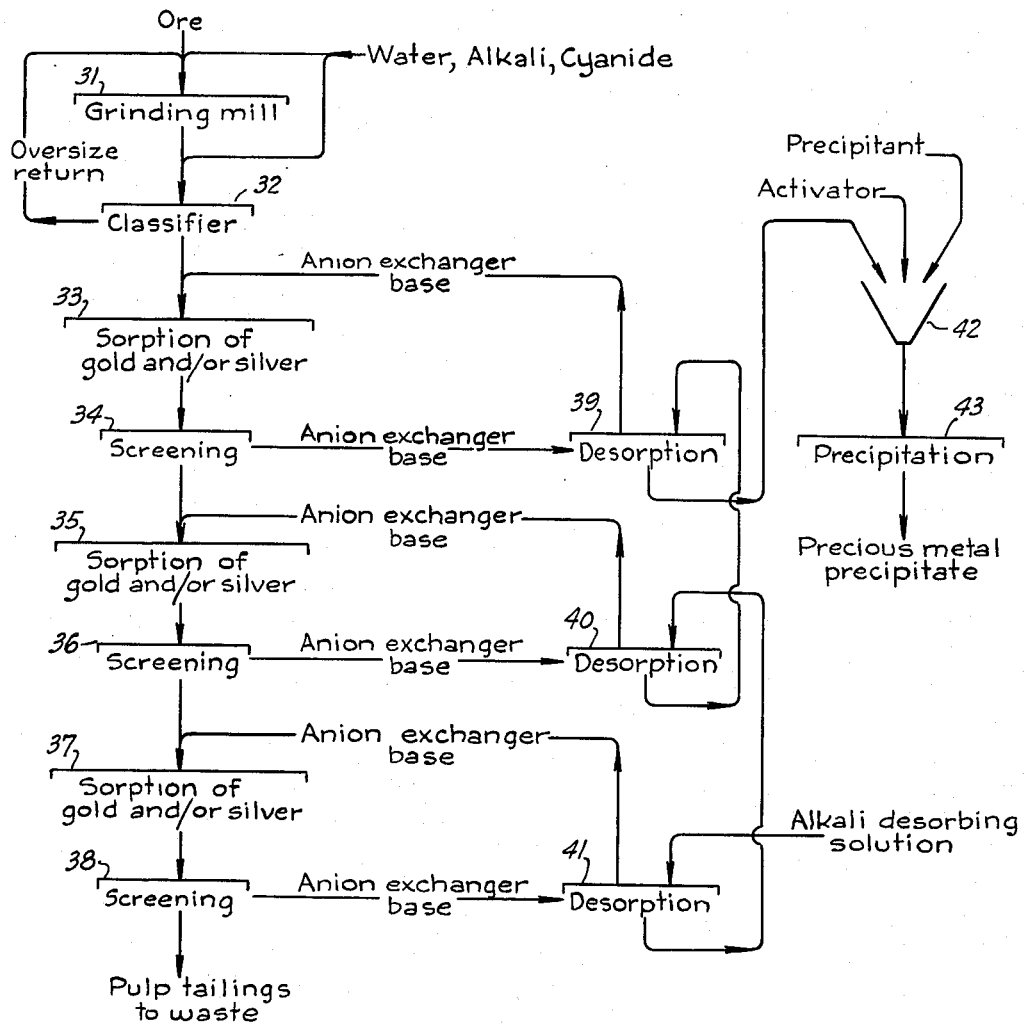
FIG_3_

Patented Aug. 11, 1953

2,648,601

UNITED STATES PATENT OFFICE 2,648,601

PROCESS FOR THE RECOVERY OF PRECIOUS METAL VALUES

Raymond E. Byler, Stanford University, and Robert C. Dunn, San Carlos, Calif., assignors to The Merrill Company, San Francisco, Calif., a corporation of California Application July 16, 1948, Serial No. 39,034

2 Claims. (Cl. 75—105)

1

This invention relates generally to processes for the recovery of precious metal values (i. e. gold and/or silver) from ore solids.

Cyanide processes for the recovery of precious metal values from ores commonly employ an alkali-cyanide solution which is contacted with the crushed ore solids to dissolve the gold and/or silver as a complex metal cyanide. The solution is then separated from the ore solids, and is clarified and contacted with a precipitant which in the more modern plants is zinc dust. The mixture of solution and zinc dust is passed through a suitable collecting filter for removing the precipitated concentrate. The efficiency of precipitation is improved by deaerating the solution prior to precipitation. Throughout the process the cyanide solution is maintained in alkaline condition in order to prevent loss of cyanide.

In conventional practice relatively large volumes of cyanide solution must be precipitated, it is not unusual to have to precipitate from 2 to 3 tons, and in some cases as high as 4 or 5 tons, of solution per ton of ore solids treated. Because of the attendant cost, and large capacity equipment involved, a process for the recovery of precious metal values which would entail precipitation of relatively small quantities of solution per ton of solids treated would provide appreciable economies in operating costs and equipment required.

The operation of separating the enriched cyanide solution from the ore solids constitutes a substantial item of cost in conventional cyanide processes, as well as requiring the installation of comparatively expensive plant equipment to carry it out. Furthermore, ore slimes are frequently of such a nature that separation or removal of the enriched solution is extremely difficult and is often attended by appreciable losses of dissolved values. In other cases the value of the material to be treated, as for example tailings from former operations, is not sufficient to warrant the installation of the relatively expensive apparatus required to separate the solution from the waste ore solids or to bear the operating costs of this step and hence cannot be economically treated by conventional practice.

It is therefore desirable generally to be able to recover the dissolved values from such ore pulps and low grade material without the step

2 of separating from the ore solids the alkali-cyanide solution containing the dissolved values.

It has been proposed to sorb dissolved metals from acid or neutral solutions of the same by the use of ion exchange resins. Thus the prior art teaches that polyamine anion exchange resins in the acid exhausted or salt condition will sorb dissolved metals such as gold from acidic or neutral solutions in which the metal exists as a complex acid anion such as the chloroaurate anion. Prior art (see Industrial and Engineering Chemistry, vol. 37, p. 618, July 1945) teaches further that sorption involving metal acid complex anions does not occur in any appreciable amount with a polyamine anion exchanger in the free base condition, that is an exchanger base, unless the solution containing the complex metal anion is acidic, and prior art also teaches that alkaline solutions desorb or remove the sorbed metal from anion exchangers.

It is an object of the present invention to provide a new cyanidation process for the removal of precious metal values from their ores, and which avoids the above described conventional precipitation from a cyanide solution.

Another object of the invention is to provide a practical cyanidation process of the above character which is characterized by the use of an ion exchange resin for sorbing precious metal values.

Another object of the invention is to provide a process of the above character which is relatively economical and which regenerates the exchange resin for reuse by a relatively simple procedure.

A further object of the invention is to provide a process of the above character which enables use of alkali protected cyanide solution while affording efficient recovery of precious metal values by ion exchange resin base sorption.

Another object of the present invention is to provide a new and improved cyanide process for the recovery of precious metal values from their ores whereby the conventional steps of separating the enriched alkali-cyanide solution from the ore solids is eliminated.

Another object of the invention is to provide a process of the above character which is efficient and relatively economical and which permits recycling of the exchange resin between sorption and desorption steps without an intermediate regeneration step.

Further objects of the invention will appear from the following description in which the preferred embodiment has been set forth in detail in conjunction with the accompanying drawing.

Referring to the drawing:

Figure 1 is a flow sheet illustrating generally a procedure incorporating the present invention.

Figure 2 is another flow sheet illustrating a more elaborate procedure for carrying out the process.

Figure 3 is another flow sheet illustrating a third embodiment of the invention.

The present invention is predicated upon our discovery that when an alkaline cyanide solution containing a substantial concentration of free hydroxyl ions, and containing complex ions of precious metal cyanide, as for example a sodium cyanide solution containing sodium auro cyanide and having a hydroxyl ion concentration corresponding to (i. e. equivalent to) about pH 10.5 (Sorenson's units), is contacted with a resinous polyamine anion exchanger in the free base condition, a substantial and unforeseen sorption of the precious metal by the anion exchanger takes place, resulting in commercially complete removal of the precious metal from the solution. In general according to our process we maintain the hydroxyl ion concentration of the cyanide solution containing the dissolved precious metals at a pH value not in excess of about pH 10 to 11 and with upper and lower limits of about pH 8 to 11, the preferred range being from about pH 8.5 to 10.5. The ion exchanger in free base condition is contacted with this alkaline cyanide solution, and the alkalinity maintained during the period of sorption. When substantial amounts of dissolved silver are present which one desires to sorb, it is desirable to use the lower hydroxyl ion concentrations.

We have further found that there is an important relation between the free hydroxyl ion content of the alkaline solution, and the efficiency of sorption, and that beyond the pH range specified the efficiency of sorption decreases rapidly. Thus we have found that little or no sorption of dissolved gold and/or silver occurs from alkaline solutions having a pH range of from 13 to 14.

We have further discovered that precious metals sorbed under the conditions specified above can be substantially completely and readily recovered from the anion exchanger by contacting the same with an alkali solution having an alkalinity somewhat above the working range previously specified, namely from pH 13 to pH 14. Desorption or recovery of the sorbed values from the ion exchanger in this manner leaves the exchanger in the desired free base condition for sorbing values from fresh solution. It is therefore a feature of our process that the polyamine anion exchanger remains as a free base in both sorption and desorption operations, and hence no extra regenerating steps or consumption of regenerants is employed.

In general therefore we have discovered that a complete sorption-desorption process can be carried out in alkaline solutions, which discovery enables us to make practical applications of resinous polyamine ion exchanger bases to processes requiring the use of alkali cyanide solutions such as are employed for the commercial cyanidation of ores containing gold and/or silver values.

In carrying out our process we use a granular resinous polyamine ion exchange base which is intermingled with an alkaline cyanide solution containing dissolved gold and/or silver. The hydroxyl ion content of the solution is within the previously specified pH range of about 8 to 11, and preferably from about 8.5 to 10.5. The cyanide solution may have been previously clarified, as by settlement and filtration, or only partially clarified as by the removal of the larger ore solids, or it may be intermingled with the ore solids in the form of a pulp. The anion exchanger efficiently sorbs the gold and/or silver from the alkaline cyanide solution, and is then removed from the cyanide solution as by screening. The removed granular exchanger is then desorbed, preferably by contacting with an alkaline solution having a hydroxyl ion concentration corresponding to pH 13 to 14. The desorbed resinous material is then in proper condition for reuse in sorbing further precious metal values, and the effluent from the desorbing operation contains the precious metal values and the same can be recovered by conventional methods of precipitation.

In the flow sheet of Figure 1 we have shown a cyanide solution containing dissolved gold and/or silver values and being supplied to the sorption operation 10. The alkalinity or hydroxyl ion concentration of the cyanide solution is maintained substantially above the neutral point, that is above pH 7.0 and preferably above about pH 8.5 (phenol phthalein point) in order to secure efficient sorption as presently explained and also in order to prevent undue loss of alkaline cyanide by hydrolysis and other undesirable reactions. For an efficient operation the hydroxyl ion concentration is maintained in a range corresponding to from pH 8 to 11, and preferably from about pH 8.5 to 10.5.

The sorption operation can be conveniently carried out by retention in a suitable agitator tank whereby during the sorption period the contents of the tank are gently agitated and intimately commingled. It is assumed in this instance that the alkaline cyanide solution is clarified, or in other words, contains no suspended matter, or that it contains only minor amounts of ore slime in suspension.

In the sorption operation the solution is intimately contacted with an anion exchange resin, and specifically a resin containing active amine groups and which is in free base condition. The base material forming this resin can, for example be a suitable phenolic aldehyde resin such as a phenolformaldehyde, and it is desirable to have the material in the form of porous granules ranging in size from about 10 to 50 mesh. It should be relatively non-friable and resistant to abrasion.

At the end of the sorption operation the granular anion exchanger is removed from the cyanide solution, as by screening the material through a screen of suitable mesh size to retain the granular exchanger. The resulting barren alkaline cyanide solution from the sorption operation may be returned to the process for reuse in dissolving further precious metals from ore.

The granular anion exchanger removed at 11 is then passed to the desorption operation 12 where the sorbed metals are removed. It is desirable to carry out this desorption operation by the use of an alkaline solution having a pH value within the range of about 13 to 14. Column percolation is a convenient method to employ for this purpose. Thus an alkaline solution, such as a solution of sodium hydroxide having a pH value of about 13 to 14 is supplied to the top of a vertical column of the anion exchanger, and the solution containing the desorbed values recovered from the bottom of the column.

The initial alkaline (i. e. caustic) solution effluent recovered from the bottom of the column will be richer in precious metals and can conveniently be supplied to a separate collecting tank 13. The subsequent effluent is relatively leaner in precious metal values and can be supplied to a separate tank 14. Additional water and sodium hydroxide can be added to this effluent to form a make-up solution for reuse in the desorption operation 12. The richer solution in the tank 13 is supplied to an operation 15 for recovering the dissolved precious metal values. This operation can be conveniently carried out by use of a suitable precipitant as for example powdered aluminum. In place of powdered aluminum zinc dust may be used together with an activator or solvent such as sodium cyanide. After introducing the precipitant, and the cyanide in the case of zinc dust, into the solution, the mixture can be passed through a conventional precipitate filter to remove the precipitated metals as a cake.

At the end of the desorption operation 12 wash water can be supplied to the top of the exchanger column to displace residual sodium hydroxide solution. The effluent from the lower end of the column resulting from the washing operation can be supplied to the lean effluent tank 14.

The use of a sodium hydroxide solution as described above for recovery of metals from the anion exchanger, leaves the exchange medium in the proper free base condition for reuse in the sorption operation 10, thus enabling the exchanger to be continuously recycled in the process.

It is possible to use other solutions for recovery of the sorbed values in the operation 12, although use of sodium hydroxide is preferred. For example it is possible to use a water-ammonia solution having a pH value of from 13.5 to 14. If gold alone is to be recovered from the exchanger, then it is possible to utilize a solution of sodium sulfide having a pH value of the order of from 12 to 13. In general however the use of sodium sulfide solution is not desirable because it complicates the removal of metals as a precipitate.

As a modification of the procedure outlined above, it is possible to use the same equipment for both the operations 11 and 12. Thus the exchanger is arranged as a vertical column, and for the sorption operation 11 the alkaline cyanide solution is supplied to the top of the column, and the values sorbed by the exchanger as the solution percolates downwardly through the column. After such a sorption operation the sodium hydroxide solution is supplied to the top of the column as described for the desorption operation 12.

Figure 2 illustrates application of our process to alkaline cyanide ore pulps in which precious metal values have been partially or substantially completely dissolved and are in solution as alkaline cyanides of the metals. Thus an alkaline cyanide ore pulp containing precious metal values is shown being supplied to the agitation and retention operation 21, where the pulp is held for a sufficient period of time to substantially complete dissolution of precious metal values. The cyanide solution of the pulp should be such that its hydroxyl ion concentration corresponds to a pH range of from 8 to 11 and preferably within the limits of pH 8.5 to 10.5. Following the operation 21 there is a series of operations 22, 23, 24 and 25. In operation 22 the pulp is intimately commingled with the anion exchanger base in a suitable agitation tank. In operation 23 the granular exchanger is removed from the pulp by screening. In operation 24 the pulp is again contacted with the granular anion exchanger for further sorption of dissolved values, and thereafter the granular exchanger is removed in operation 25 as by screening.

The anion exchanger removed in the operation 23 is supplied to the desorption operation 26, in which the exchanger is treated with a caustic solution for the desorption of the precious metal values, the same as operation 12 of Figure 1. The anion exchanger from operation 26 is shown being supplied to the sorption operation 24. The exchanger removed in operation 25 is returned to the first sorption operation 22.

In the operation of the process of Figure 2 the ion exchanger should have a particle size substantially greater than the particle size of the largest ore solids present. For example where the ore solids of the pulp are all minus 65 mesh, the anion exchanger can have the particle size of the order of from 10 to 48 mesh.

In the process shown in Figure 2 the ion exchanger is advanced through the process countercurrently to the flow of ore pulp, thus enabling efficient recovery of precious metal values, with a minimum amount of values remaining in the ore pulp, and with a maximum loading of the ion exchanger with sorbed values. While it is generally desirable to add the exchanger base to the pulp after all or a major part of the soluble precious metals have been dissolved by the cyanide, it should be understood that substantially all or a considerable amount of dissolution may take place simultaneously with sorption, to an extent dependent upon the time period of retention of the ore solids in contact with the cyanide solution, prior to addition of the exchanger.

Figure 3 illustrates a more elaborate procedure for applying our process to the treatment of ores and metallurgical products, such as tailings, containing gold or silver or both. Thus fresh ore is shown being supplied to the grinding mill 31, which may be a rod or ball mill, connected in closed circuit with the classifier 32. Water, alkali and cyanide are also shown being supplied to these operations. The cyanide is generally sodium or potassium cyanide, and the alkali is lime. In a typical instance, water may be added to form a pulp of 75% solids in the grinding mill 31 and 25% solids in the classifier 32, sodium cyanide may be added in the amount of 2 lbs. per ton of ore, and sufficient lime added to adjust the hydroxyl ion concentration so that the solution has a pH value of about 10.

The hydroxyl ion concentration is maintained generally between the pH limits of 8 to 11, and preferably within the more specific limits of pH 8.5 to 10.5. In the event all of the precious metal values have not been completely dissolved in the cyanide solution after grinding, it is desirable to retain the pulp in a suitable retention tank until dissolution is substantially complete. The pulp is then treated in a series of operations 33, 34, 35, 36, 37 and 38. In operation 33 the pulp is commingled with an ion exchanger of the type previously specified to effect sorption of dissolved gold and/or silver. The ion exchanger used in operation 33 is obtained from the desorption operation 39.

In operation 34 the ion exchanger is removed from the pulp as by screening, and is supplied to operation 39 for desorption. The pulp from operation 34 passes to the second sorption operation 35, where it is commingled with an ion exchanger obtained from the desorption operation 40. After sorption at 35 the pulp is subjected to screening at 36 for removing the ion exchanger, which is then supplied to the desorption operation 40. The pulp from the screening operation 36 is supplied to the third sorption operation 37, where it is contacted with an ion exchanger from the desorption operation 41. In the subsequent screening operation 38 the ion exchanger is removed and supplied to the desorption operation 41. Alkali desorbing solution, such as sodium hydroxide solution having a pH value of from 13 to 14, is supplied to the last desorption operation 41, and the effluent from this operation is supplied to the desorption operation 40. The effluent from operation 40 is supplied to the first desorption operation 39. Effluent from operation 39, which is relatively rich in precious metal values, is shown being supplied to the vessel 42 where it is intermixed with a suitable precipitant and an activator, and the mixture then supplied to the precipitating operation 43.

In the process of Figure 3 the anion exchanger likewise progresses countercurrently to the ore pulp being treated. Likewise the alkali desorbing solution progresses countercurrently through the various desorption operations, to provide a relatively rich solution for precipitation.

Various examples of our process are as follows:

Example I

Three grams of a polyamine anion exchange resin in the free base condition, in this case specifically Duolite A-3 resin having a particle size ranging from 10 to 48 mesh, were placed in a conventional percolating column of 13 mm. internal diameter. The resin was first converted to the free base condition by passing through the column 200 ml. of 5% caustic soda solution, followed by a water wash.

250 ml. of an alkaline cyanide solution containing 3.59 milligrams of gold, 75 milligrams sodium cyanide, and 2 milligrams caustic soda, and having a pH value of 10.4, was passed through this prepared ion exchanger bed by column percolation at a rate of approximately 5 volumes of solution per volume of exchanger per hour. This was followed by a water wash to displace residual cyanide solution from the bed.

The alkalinity of the collected effluent was pH 10.5, and the gold content totalled 0.015 milligram of gold, indicating sorption by the ion exchanger bed of 3.575 milligrams gold, or 99.5% of the gold contained in the cyanide solution supplied to the process.

A desorption operation was then carried out by passing 200 ml. of a 1% caustic soda solution (pH) 13.2) through the anion exchanger bed at approximately the same rate of flow as was used in the sorption step. After each 50 ml. of the caustic recovering solution was passed through the bed, an intermediate wash of 250 ml. of water was used and the gold content of the combined solution and washed effluent was recovered.

The relative gold contents of the effluents were as follows:

|  | Gold Recovered, mg. | Distribution, percent |
|---|---|---|
| 1st 50 ml. caustic solution | 2.700 | 78.15 |
| 2nd 50 ml. caustic solution | .500 | 14.46 |
| 3rd 50 ml. caustic solution | .180 | 5.22 |
| 4th 50 ml. caustic solution | .075 | 2.17 |
| Total 200 ml. caustic solution | 3.455 | |

As shown by the above results, the caustic soda solution in the desorption operation recovered 96.6% of the gold sorbed by the resin, and the bulk of the total gold recovered by this solution was contained in the first half of the effluent passing through the resin bed. It is this richer portion which normally would be collected in the separate tank 13 of Fig. 1, and the balance supplied to the tank 14 for recycling in the process.

Example II

The following is an example corresponding generally to the procedure outlined in Figure 2.

Ore from a Philippine mine containing 0.095 ounce gold per ton was ground in an open circuit ball mill to all minus 65 mesh and 70% minus 200 mesh, thickened to 2:1 dilution (water to ore solids) and agitated (21 Figure 2) for 24 hours with an alkali cyanide solution prepared by adding sodium cyanide to the extent of 0.50 lb. per ton of solution and lime equal to 5.0 lbs. per ton of ore solids. At the end of the 24 hour agitation step the cyanide solution contained an average of 0.25 lb. sodium cyanide per ton of solution, and had an average pH value of 9.3.

The pulp was then passed to the sorption operation 22 where it was commingled with a granular anion exchange resin in the free base condition, in this case Duolite A-3 ranging in particle size from 10 to 48 mesh and derived from the screening operation 25. The exchanger was introduced in an amount equal to 18 lbs. anion exchanger per ton of solution. Contact was continued for a period of 22 hours.

The pulp leaving operation 22 was then passed to the screening operation 23 carried out by the use of a 48 mesh stainless steel screen, to thereby separate out the ion exchanger. The pulp was then supplied to the second and final sorption operation 24 where it was commingled with a freshly desorbed ion exchanger base from operation 26. The quantity of exchanger used in operation 24 was an amount equal to 18 lbs. per ton of solution, and contact was continued for a period of 22 hours, after which the pulp was then passed to the second screening operation 25. The anion exchanger separated at 25 was then supplied to the first sorption operation 22. The final tailings solids and solution separated out at 25 were analyzed for losses. The pulp solution at this point had an average unconsumed cyanide content of 0.15 lb. sodium cyanide per ton of solution, and averaged pH 9.5.

The anion exchanger collected on screen 23 was washed with water to remove adhering slime, after which it was placed in a batch column percolation apparatus for the sorption operation 26, and a 1% caustic soda solution passed through the exchanger bed at a rate of approximately 5 volumes solution per volume of anion exchanger per hour. A total of 22 lbs. of caustic solution per pound of anion exchanger was passed through the column in four equal volumes with intermediate water washing. A final water wash was used to displace the caustic solution from the ion exchanger bed. The anion exchanger was then returned without any further preparation to the sorption operation 24 as previously described.

The above test was run continuously for 75 consecutive days, and the system was assumed to be equilibrium when periodic assays of solution and ore solids became fairly constant. Average results after equilibrium was reached were as follows:

|  | oz. Gold per ton ore | Percent |
|---|---|---|
| Gold recovered from anion exchanger in recovery operation | 0.0900 | 94.7 |
| Dissolved gold remaining in tailings solution | .00083 | |
| Undissolved gold remaining in ore solids | .0042 | |
| Total gold in ore | .09503 | |

In the foregoing example a recovery of 94.7% of the gold in the ore was obtained, without the use of comparatively expensive filtration and/or decantation operations and equipment required by prior conventional cyanidation practice.

Note that no addition of fresh anion exchanger was made during the entire 75 day test, but on the contrary the original anion exchanger was continuously recycled between sorption and recovery operations without appreciable loss of activity under the conditions of our process.

With respect to Duolite A–3 resin, this exchanger was initially converted to a free base by contact with a caustic soda solution.

We claim:

1. In a process of recovering precious metal values from ore, the steps of dissolving said values by cyanidation; adjusting and maintaining the free hydroxyl ion concentration of the cyanide solution in a pH range between 8 to 11 after economic completion of the dissolution of said values while sorbing said dissolved values on a resinous polyamine anion exchanger in free base condition; separating said exchanger with the sorbed values from said solution; and desorbing said values from said separated exchanger in an alkaline solution different from said cyanide solution while maintaining the free hydroxyl ion concentration of said alkaline solution in pH range about 13 to 14.

2. In a process of recovering precious metal values from ore, the steps of dissolving said values by cyanidation to substantial completion; adjusting and maintaining the free hydroxyl ion concentration of the cyanide solution in pH range between 8 to 11 while sorbing said dissolved values on a resinous polyamine anion exchanger in free base condition; separating said exchanger with the sorbed values from said solution; and desorbing said values from said separated exchanger in an alkaline solution different from said cyanide solution while maintaining the free hydroxyl ion concentration of said alkaline solution in a pH range between about 13 to 14.

RAYMOND E. BYLER.
ROBERT C. DUNN.

References Cited in the file of this patent

UNITED STATES PATENTS

| Number | Name | Date |
|---|---|---|
| 2,220,212 | Clark et al. | Nov. 5, 1940 |
| 2,434,190 | Barnes et al. | Jan. 6, 1948 |
| 2,442,989 | Sussman | June 8, 1948 |

FOREIGN PATENTS

| Number | Country | Date |
|---|---|---|
| 106,727 | Australia | Mar. 9, 1939 |

OTHER REFERENCES

Dorr and Bosqui: "Cyanidation and Concentration of Gold and Silver Ores," 2nd ed., McGraw-Hill Book Co., Inc. (1950), pp. 20, 232, and 243. Copy in Scientific Library.

MacFarren: "Cyanide Practice," McGraw-Hill Book Co., Inc. (1912), p. 61. Copy in Div. 3.

Report of Investigations #4374, pub. by the Bureau of Mines, Jan. 1949, p. 9. Copy in Scientific Library.

Mining Congress Journal, Feb. 1947, p. 42. Copy in Scientific Library.